Oct. 27, 1936.    W. P. KELLETT    2,058,891
TRUCK EQUIPMENT FOR TRANSPORTING GOODS CONTAINERS
Filed Feb. 28, 1935

Inventor.
William Platts Kellett.

Patented Oct. 27, 1936

2,058,891

UNITED STATES PATENT OFFICE 2,058,891

TRUCK EQUIPMENT FOR TRANSPORTING GOODS CONTAINERS

William Platts Kellett, New York, N. Y.

Application February 28, 1935, Serial No. 8,684

5 Claims. (Cl. 280—33.1)

The principal objects of this invention are to facilitate the handling of mobile goods containers in "door-to-door" delivery of merchandise, and to provide a truck equipment particularly adapted for handling goods containers of half carload capacity in the transportation thereof to and from warehouse and railroad, so that the minimum of length of truck transport may be obtained.

The principal features of the invention consist in the novel construction of a semi-trailer transport equipment whereby an elevating platform is provided to directly support a cantilever type of container in the handling of the container in moving same to and from the truck, said trailer equipment being provided with supplementary supporting means forward of the elevating platform to support the extending end of the container during its transportation from place to place on said truck equipment.

In the accompanying drawing, Figure 1 is a plan view of a semi-trailer equipment as contemplated in the present invention.

Figure 1:
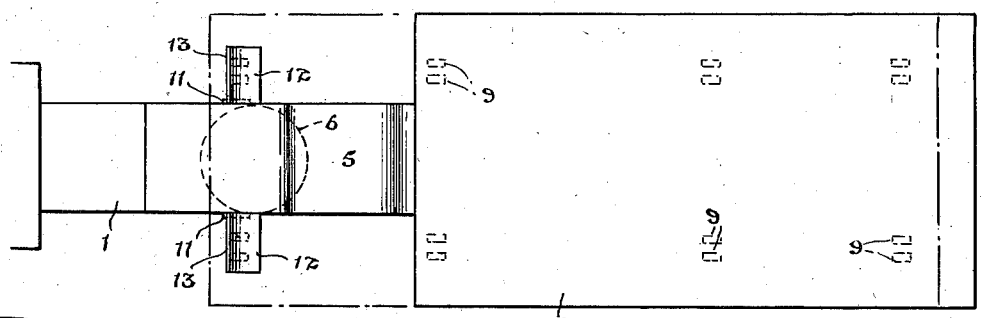
Figure 2:
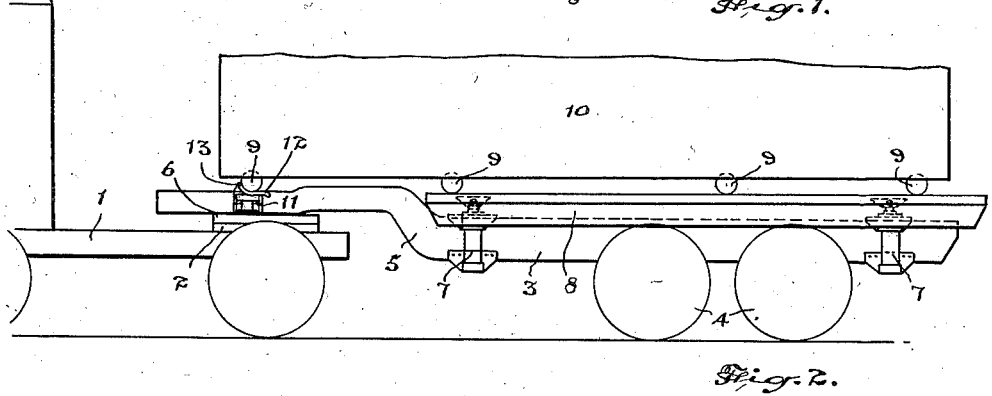
Figure 2 is a side elevational view showing a trailer in its normal position attached to a tractor and carrying a goods container shown in part elevation thereon.
Figure 3:
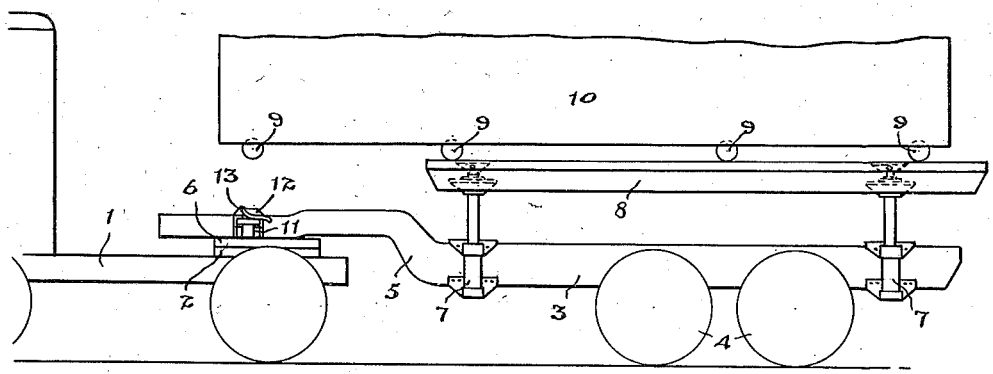
Figure 3 is a side elevational view of the equipment shown in Figure 2 showing the platform of the trailer in the raised position supporting the container clear of the remainder of the trailer structure.
Figure 4:
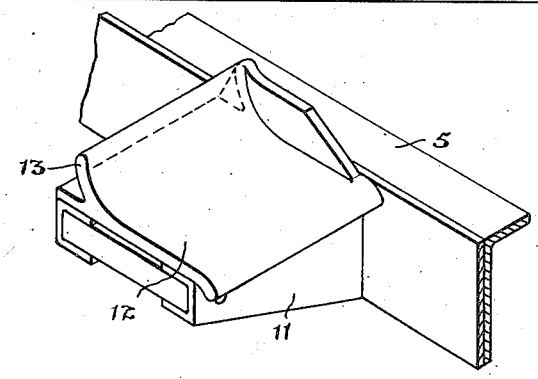
Figure 4 is an enlarged perspective detail of one of the "saddle" supports for the front end of the container.

In the handling of goods containers in the form of large casings mounted upon castors for rolling support upon the floors of warehouses and platforms of cars, it is necessary to provide a very flexible equipment for the transporting of the containers from warehouse to railway car, and as half-carload containers are quite a considerable length, the trailers for transporting such are necessarily long, and it is with the purpose of greatly shortening the required over-all length of this equipment that the present invention has been devised.

The tractor 1 which may be of any suitable form, and is here shown diagrammatically, is provided with a turntable structure 2 at its rear end. The trailer is formed with a frame 3 mounted upon a close-coupled set of wheels 4, and said frame is provided with an upwardly offset forward portion 5 which extends over the turntable and is provided with a mating portion 6 co-operating with said turntable.

An arrangement of hydraulic jacks 7 of suitable design is provided on the chassis of the trailer and supports a platform 8 which is suitably constructed to receive and support the castor mountings 9 of the goods container 10. These castor mountings are arranged on the container so that the ends of the container structure are in a cantilever arrangement, that is to say, sets of castors are arranged adjacent to the ends of the container and at points intermediate of the length thereof, approximately one quarter of such length, so that the container in being wheeled from a railway car on the truck and from the truck on to a platform may be self-supported for the length of the distance between the end pair of castors and the next adjacent set.

The platform 8 of the trailer equipment herein shown is long enough to accommodate the two central sets of rollers and one end set, and the other end of the container will project beyond the platform and over the offset portion 5 of the trailer frame.

A pair of bracket members 11 are rigidly mounted upon the side members of the forward end of the offset portion of the frame 3, and mounted above the top or forming part thereof, are saddle-shaped plates 12 formed with an upwardly curved flange 13 adapted to engage the periphery of the forward set of castor rollers on the container and to form chocks for same when the platform 8 is in its lowered position.

Suitable means is provided, though it is not shown in the accompanying drawing, for securely locking the container on the trailer with the forward end of the container extending well over the turntable and the tractor. The container body is placed as close up to the cab of the tractor as may be permissible to allow the tractor to swing properly in turning.

An equipment such as described has been put into practical operation and it is found to work very satisfactorily in the transport of railway car goods containers from place to place.

What I claim as my invention is:—

1. A truck equipment for transporting a removable goods container comprising a trailer having a lower main portion, an elevated forward portion adapted to support one end of said container and to be supported by a tractor, and an elevating platform for supporting said container mounted on the lower portion of said trailer and when in its lowermost and load transporting position having its container supporting portion in alignment with the container supporting portion of the elevated forward portion of the trailer.

2. A truck equipment for transporting a removable goods container comprising a trailer having a lower main portion, an elevated forward portion adapted to support one end of said container and to be supported by a tractor, an elevating platform for supporting said container mounted on the lower portion of said trailer and when in its lowermost and load transporting position having its container supporting portion in alignment with the container supporting portion of the elevated forward portion of the trailer and a container supported from both ends of said elevating platform and extending over the elevated forward portion of the trailer frame and being supported by said elevated portion beyond the platform.

3. A truck equipment for transporting a removable goods container comprising a trailer having a lower main portion, an elevated forward portion adapted to support one end of said container and to be supported by a tractor having rear driving wheels, an elevating platform for supporting said container mounted on the lower portion of said trailer and when in its lowermost and load transporting position having its container supporting position in alignment with the container supporting portion of the elevated forward portion of the trailer and a container supported from both ends of said elevating platform and extending over the elevated forward portion of the trailer frame and being supported by said elevated portion at a point forward of the vertical line of support of the rear tractor wheels.

4. A truck equipment for transporting goods containers comprising a trailer having a lower main portion and a narrow elevated forward portion adapted to be supported by a tractor, brackets extending laterally from said narrow elevated portion of said trailer forming chocks adapted to support one end of a removable goods container, an elevating platform for supporting a goods container mounted on the lower portion of said trailer and when in its lowermost and load transporting position having its container supporting portion in alignment with the container supporting portion of said brackets, and a container of greater length than said platform resting thereon and supported at its forward end by said brackets.

5. A device as claimed in claim 2 in which the container is provided with roller supports arranged to rest upon the platform and to support the forward end of the container in a cantilever position when the platform is elevated to raise the container from the support of the forward end of the frame.

WILLIAM PLATTS KELLETT.